Patented Feb. 13, 1934

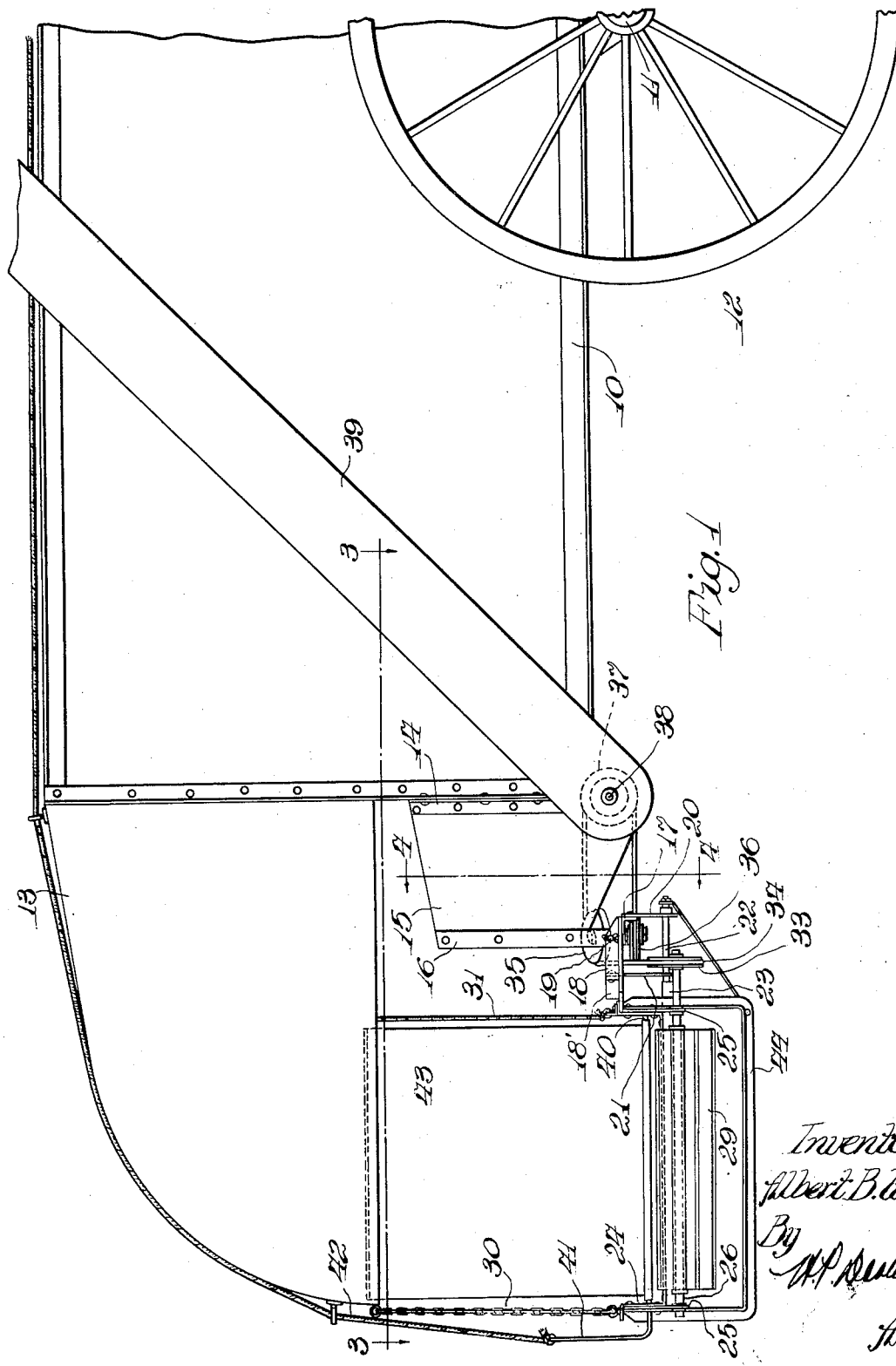

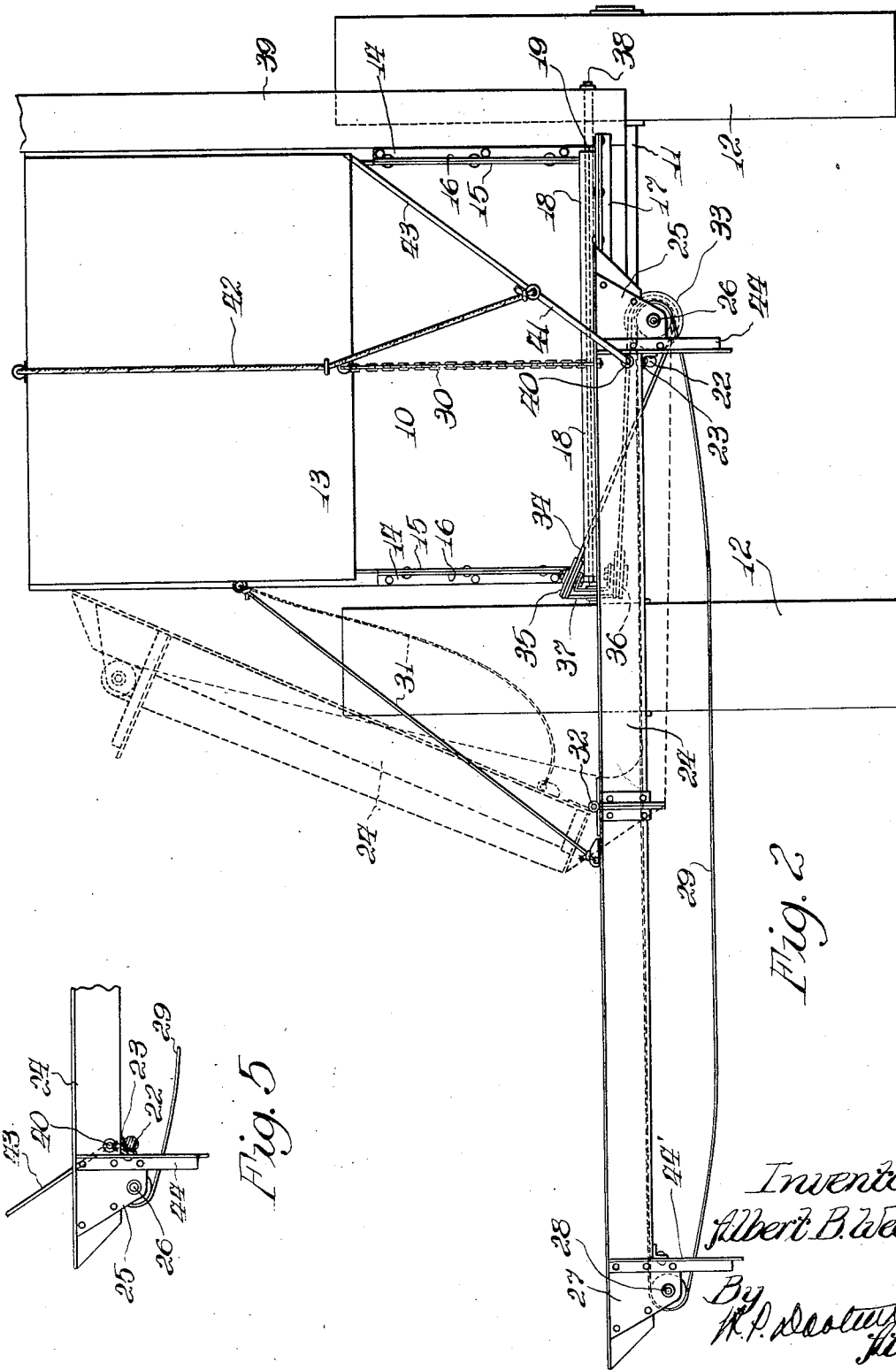

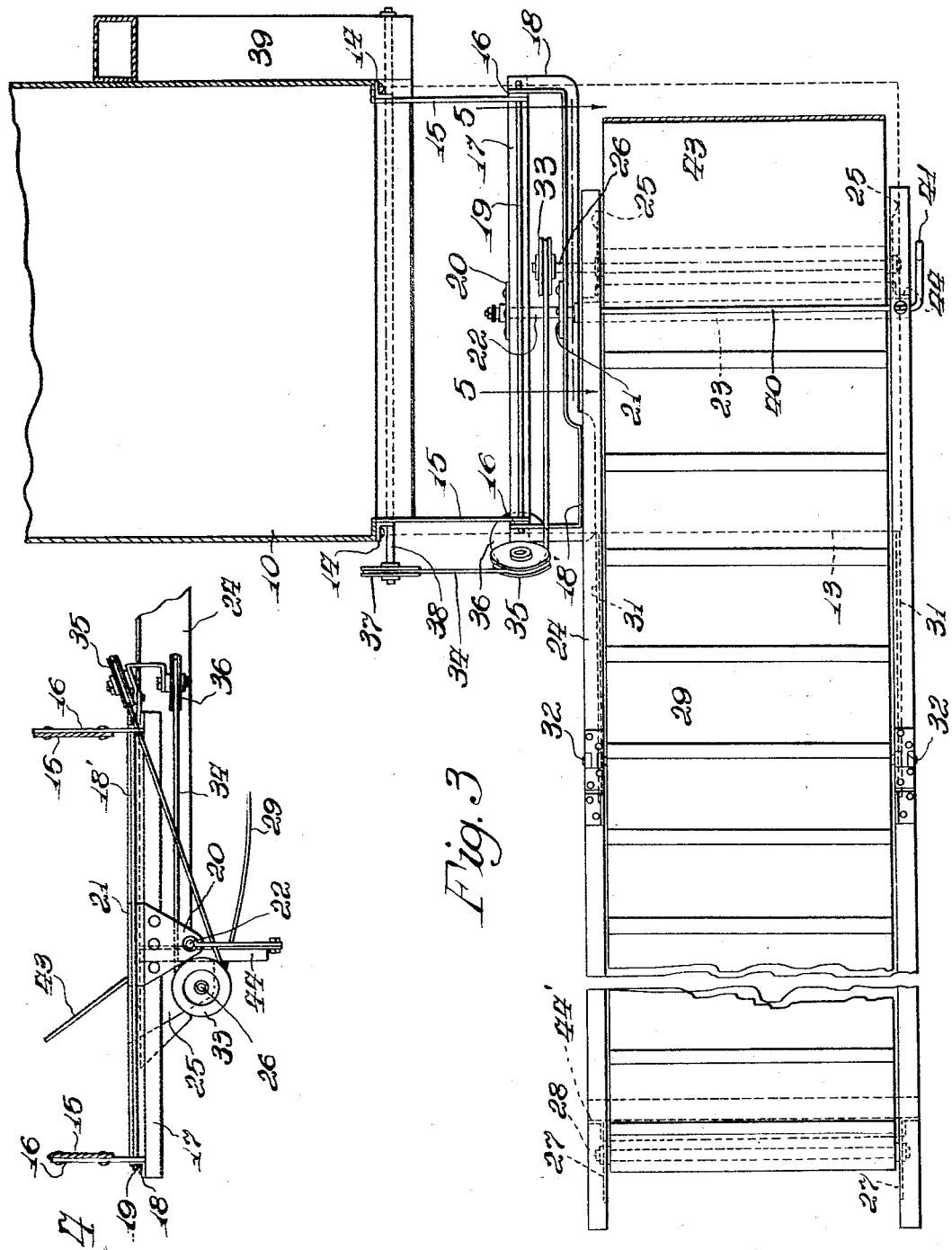

1,946,654

UNITED STATES PATENT OFFICE 1,946,654

STRAW WINDROWER FOR HARVESTER-THRESHERS

Albert B. Welty, Kenilworth, Ill., assignor to International Harvester Company, a corporation of New Jersey Application October 26, 1932. Serial No. 639,546

11 Claims. (Cl. 56—122)

The invention relates to a straw windrowing attachment for harvester threshers.

Such attachments are located at the straw discharge end of the harvester thresher to catch the straw coming out of the thresher part and to move it in a manner to accumulate it in windrows as the harvester thresher travels along. Accordingly, the straw can subsequently be picked up with a hay loader or other pick-up device, to be gathered and stored for various farm uses, where it is desired to save and use the straw rather than have such straw scattered onto the field directly from the harvester thresher to be plowed under for fertilizer.

The object of the present invention is to provide a straw windrower arranged rearwardly of the thresher part of a harvester thresher and to be supported thereby in an improved manner, said windrower being an attachment comprising a transversely disposed, endless conveyer located with its grainward end approximately underneath the straw deflector hood of the thresher part, so that the conveyor may receive the straw and convey it stubblewardly to form a windrow.

Another object is to provide a deflector with a novel remote control therefor, said deflector directing the straw onto the conveyer in one position, and onto the ground clear of the end of the conveyer when in another position.

Another object is to provide such a conveyer which projects stubblewardly of the thresher part and is provided with hinge means intermediately of its ends, so that the outer, stubbleward portion thereof may be folded for clearance purposes.

Still another object is to floatingly hang the attachment from the thresher part, so that accidental engagement thereof with the ground during travel will not damage the attachment.

Other objects will become apparent to those skilled in this art as the disclosure is more fully made.

These objects are achieved by the practicable form of the invention shown in the accompanying sheets of drawings, in which:

Figure 1 is a side elevational view of the rear portion of the thresher part of a harvester thresher showing the straw windrowing attachment connected thereto in operative position;

Figure 2 is a rear elevational view of the structure shown in Figure 1, the dotted line position showing the outer end of the conveyer folded up, so as not to constitute a lateral obstruction;

Figure 3 is a top plan view of the structure shown in Figure 1, with the straw discharging hood of the thresher part indicated in dotted lines for the sake of clearness, and parts of the thresher shown in section, as viewed along the line 3—3 appearing in Figure 1;

Figure 4 is a transverse view, looking from the front, along section line 4—4, to show in detail the driving connections; and, Figure 5 is a similar detail view, but showing parts appearing along the line 5—5 in Figure 3, when viewed from the front to the rear, as indicated by the arrows.

Looking now to these drawings in detail, it will be seen that a standard harvester thresher has been represented by merely illustrating the thresher part 10 thereof, which part, as usual, is mounted on a transverse axle 11, journaled in a pair of ground wheels 12. At the rear, the body 10 carries a straw deflecting hood 13 open at its lower end to discharge the straw from the harvester thresher.

The preliminary step to save this straw rather than to scatter it onto the field is to catch the same at the hood 13 and form it into windrows, preferably of double thickness. This is accomplished herein by the windrower attachment of this invention, next to be described.

Each rear side frame of the part 10 has secured to it an angle bar 14 to which are connected the vertical, rearwardly extending side plates 15, said plates each carrying at their rear edge a second iron bar 16, which latter bar is flat, as shown. A transverse angle iron bar 17 has connected to its ends the legs of a U-shaped angle iron 18, and the legs of said U-member in turn are pivotally connected to the lower ends of plates 16 by means of a transverse hinge rod 19. The bar 17 substantially midway between its end carries a downwardly extending plate 20 and the bight of the U-frame 18 carries a similar plate 21, these two plates serving to carry a longitudinally disposed, rearwardly extending rockshaft 22 nested in an angle iron 23, to which it is connected by welding, for example. Carried on this angle bar 23 is a transversely disposed, trough shaped sheet metal platform, or frame 24, which carries at its ends along front and rear sides thereof aligned brackets 25 at the inner end to journal a roller shaft 26, and at the outer end, aligned brackets 27 carrying an idler roller shaft 28. Trained around these roller shafts is an endless, apron type of conveyer 29, said conveyer being located with its inner end underneath the hood 13 and said inner end terminating at substantially the longitudinal median line of the thresher part 10, while its free or outer end is projected transversely in a stubbleward direction of the hood 13 a predetermined distance for a purpose later to appear.

The platform 24 and conveyer 29 are additionally supported by a flexible element, such as the chain 30, connected between the rear edge of the hood 13 and the rear edge of the platform 24. Flexible elements, such as the ropes 31, carry the weight of the outer or stubbleward end of the platform, from the stubbleward side of the hood 13. This frame 24 also rests on a projected portion 18' of the member 18, as shown in Figure 3. Further, at an intermediate point, the platform 24 is provided with longitudinally aligned hinges 32, as shown, whereby the outer, stubbleward end thereof may be folded upwardly to the position shown in the dotted lines in Figure 2, alongside the stubbleward side of the hood 13, to enable a wagon to be drawn closely alongside the harvester thresher, as when emptying the grain tank thereof, or for narrowing the width of the machine for travel transport clearance. The manner of driving the conveyer 29 will next be described.

The shaft 26 is extended longitudinally forwardly, as shown in Figure 3, where it carries fast thereon a pulley wheel 33, around which is trained a driving belt 34, that also engages around idler pulleys 35, 36 appropriately carried by the stubbleward corner of the frame piece 18, said belt being driven from a pulley wheel 37 on the stubblewardly extended elevator auger shaft 38 at the rear lower edge of the thresher part 10. This shaft 38 is the usual shaft for driving a conveyer, not shown, in the elevator 39 carried at the grainward side of the body 10. In this fashion, then, the roller shaft 26 is driven in a direction to operate the upper run of the endless conveyer 29 in a stubbleward direction.

Just above the grainward end of the conveyer 29, the platform 24 carries in its sides a longitudinal rockshaft 40 having a rear crank-shaped end 41, which extends vertically and has an eye formed in its upper end to receive a pull rope 42 extending upwardly over the hood 13 and forwardly over the thresher body 10 to the operator's station at the forward end of the harvester thresher, not shown. This rockshaft 40 has fixed thereto a deflector board 43, which may be flipped grainwardly to cause all straw coming from the hood 13 to be deflected onto the conveyer 29, or may be flipped stubblewardly to cause the straw to be deflected away from the conveyer so as to cause it to be discharged directly onto the ground.

The under side of the platform 24 carries a longitudinally disposed, U-shaped runner member 44, to protect the windrower attachment from damage in the event it hits a high spot in traveling over uneven ground. At its other end, another runner 44' is provided. The use and operation of the improved straw windrower will next be described.

The windrowing attachment is connected to and hung from the rear end of the thresher part in the manner described, so that the conveyer 29 will have its grainward end disposed about half way under the hood 13. On the first round of the machine, the operator sets the deflector 43 so that it is tilted stubblewardly, so that the straw from the hood is deflected away from the conveyer 29 and is directed to the ground where it falls into windrow formation. On the next round of the harvester thresher, the operator from his seat, not shown, pulls the rope 42 to flip the deflector 43 over center to its grainward position and, as a result, all of the straw from the hood 13 is directed onto the conveyer 29. This conveyer moves the straw stubblewardly to discharge the same off its end, directly onto the first round windrow already laid, and for that purpose the length of the conveyer must be exactly predetermined to produce this result. Such a double windrow is desirable, as it facilitates the picking up or gathering operation. The pulley drive 34, of course, is operative all the time to drive the conveyer, but this is not objectionable where the rounds are short. On the longer rounds, the belt could be slipped from its pulleys to keep the conveyer idle when the straw is being dumped directly on the ground. And so on, every other round, the straw is deflected directly from the hood onto the ground, or onto the conveyer and delivered thereby to the windrow, as described.

From this description it is now clear that an improved straw windrowing attachment has been provided for harvester threshers, which, by means of the runners 44, 44', is saved from injury, should the attachment strike the ground, because of its flexible hanging from chain 30 and ropes 31, and the hinges 22 and 19. Thus, the platform floats or hinges in two directions; that is, about the longitudinal hinge 22, or the transverse hinge 19.

Therefore, the attachment achieves the objects of the invention heretofore recited. It is the intention to cover all such changes and modifications of the form herein shown which do not depart from the spirit and scope of my invention as indicated by the following claims.

What is claimed is:

1. A straw windrowing attachment for harvester threshers, said attachment comprising a transversely disposed conveyer connected to the rear end of the thresher part of the harvester thresher with its grainward end arranged substantially on the longitudinal median line of the thresher part and its other end located a substantial distance laterally in a stubbleward direction of the thresher part, means to drive the conveyer in a stubbleward direction, and a deflector hinged on a longitudinal horizontal axis adjacent the grainward end of the conveyer, said deflector adapted in one position to direct the straw from the thresher part onto the conveyer and in another position to deflect the straw off-end relative to the grainward end of the conveyer directly onto the ground.

2. A straw windrowing attachment for harvester threshers, said attachment comprising a transversely disposed frame carried conveyer directly connected to the rear end of the thresher part of the harvester thresher with its grainward end arranged substantially on the longitudinal median line of the thresher part and its other end located a substantial distance laterally in a stubbleward direction of the thresher part, means to drive the conveyer from a movable part of the thresher part in a stubbleward direction, and a deflector hinged on a longitudinal horizontal axis adjacent the grainward end of the conveyer, said deflector adapted in one position to direct the straw from the thresher part onto the conveyer and in another position to deflect the straw off-end relative to the grainward end of the conveyer directly onto the ground.

3. A straw windrowing attachment for harvester threshers, said attachment comprising a transversely disposed conveyer connected to the rear end of the thresher part of the harvester thresher with its grainward end arranged substantially on the longitudinal median line of the thresher part and its other end located a substantial distance laterally in a stubbleward direction of the thresher part, means to drive the conveyer in a stubbleward direction, a deflector hinged on a longitudinal horizontal axis adjacent the grainward end of the conveyer, said deflector adapted in one position to direct the straw from the thresher part onto the conveyer and in another position to deflect the straw off-end relative to the grainward end of the conveyer directly onto the ground, and a remote control means for flipping the deflector from one position to the other.

4. A straw windrowing attachment for harvester threshers provided with a straw discharging hood at the rear of its thresher part, said attachment comprising a transversely disposed conveyer connected to the rear end of the thresher part of the harvester thresher with its grainward end arranged substantially on the longitudinal median line of the thresher part below said hood and its other end located a substantial distance laterally in a stubbleward direction of the hood, means to drive the conveyer in a stubbleward direction, and a deflector hinged on a longitudinal horizontal axis adjacent the grainward end of the conveyer and underneath said hood, said deflector adapted in one position to direct the straw from the hood onto the conveyer and in another position to deflect the straw off-end relative to the grainward end of the conveyer directly onto the ground.

5. A straw windrowing attachment for harvester threshers provided with a straw discharging hood at the rear of its thresher part, said attachment comprising a transversely disposed conveyer connected to the rear end of the thresher part of the harvester thresher with its grainward end arranged substantially on the longitudinal median line of the thresher part below said hood and its other end located a substantial distance laterally in a stubbleward direction of the hood, means to drive the conveyer in a stubbleward direction, a deflector hinged adjacent the grainward end of the conveyer and underneath said hood, said deflector adapted in one position to direct the straw from the hood onto the conveyer and in another position to deflect the straw off-end relative to the grainward end of the conveyer directly onto the ground, and a flexible pull element running from the deflector over the hood and thresher part for remote control to flip the deflector from one position to another.

6. A straw windrowing attachment for harvester threshers, said attachment comprising a transversely disposed frame supported conveyer connected to the rear end of the thresher part of the harvester thresher with its grainward end arranged substantially on the longitudinal median line of the thresher part and its other end located a substantial distance laterally in a stubbleward direction of the thresher part, means to drive the conveyer in a stubbleward direction, a deflector hinged on a longitudinal horizontal axis adjacent the grainward end of the conveyer, said deflector adapted in one position to direct the straw from the thresher part onto the conveyer and in another position to deflect the straw off-end relative to the grainward end of the conveyer directly onto the ground, flexible means supporting the outer stubbleward end of the conveyer frame from the stubbleward side of the thresher part, and hinge means to enable the outer stubbleward portion of the conveyer and its frame to be folded upwardly alongside the adjacent side of the thresher part.

7. A straw windrowing attachment for harvester threshers provided with a straw discharging hood at the rear of its thresher part, said attachment comprising a transversely disposed conveyer connected to the rear end of the thresher part of the harvester thresher with its grainward end arranged substantially on the longitudinal median line of the thresher part below said hood and its other end located a substantial distance laterally in a stubbleward direction of the hood, means to drive the conveyer in a stubbleward direction, a deflector hinged adjacent the grainward end of the conveyer and underneath said hood, said deflector adapted in one position to direct the straw from the hood onto the conveyer and in another position to deflect the straw off-end relative to the grainward end of the conveyer directly onto the ground, flexible means supporting the outer stubbleward end of the conveyer frame from the stubbleward side of the hood, and hinge means to enable the outer stubbleward portion of the conveyer and its frame to be folded upwardly alongside the adjacent side of the hood.

8. A straw windrowing attachment for harvester threshers having a thresher part, said attachment comprising a frame disposed transversely at the rear end of said thresher part, means embodying a horizontal transverse hinge for so connecting said frame, a longitudinal horizontal hinge for supporting the grainward end of the frame, a conveyer on the frame having its grainward end located in a position to receive straw discharged from the thresher part, flexible means for hanging said attachment from the thresher part, and a deflector which in one position directs discharging straw from the thresher part onto the conveyer and in another position causes the straw to fall on the ground clear of said conveyer.

9. A straw windrowing attachment for harvester threshers having a thresher part, said attachment comprising a frame disposed transversely at the rear end of said thresher part, means embodying a horizontal transverse hinge for so connecting said frame, a longitudinal horizontal hinge for supporting the grainward end of the frame, a conveyer on the frame having its grainward end located in a position to receive straw discharged from the thresher part and its stubbleward end projecting a substantial distance stubblewardly of the thresher part, means to drive the conveyer in a stubbleward direction, and flexible means for hanging said attachment from the thresher part.

10. A straw windrowing attachment for harvester threshers having a thresher part provided with a straw discharging hood at its rear end, said attachment comprising a frame disposed transversely at the rear end of said thresher part, means embodying a transverse hinge and a longitudinal hinge for connecting the frame to the thresher part, a conveyer on the frame located underneath the hood, flexible means for hanging said attachment from said hood, and a deflector which in one position directs the straw from the thresher part onto the conveyer and in another position causes the straw to be discharged onto the ground clear of the conveyer.

11. A straw windrowing attachment for harvester threshers provided with a straw discharging hood at the rear of its longitudinal thresher part, said attachment comprising a frame connected to the thresher part at its rear end below the hood, a transverse conveyer on the frame having an end terminating substantially on the rearwardly projected longitudinal median line of the thresher part, and a movably mounted deflector for causing straw discharged from the hood to be deflected either onto the conveyer or to one side clear of the conveyer and directly onto the ground.

ALBERT B. WELTY.